Aug. 4, 1931.  H. E. SIPE  1,817,771
SNUBBER
Filed July 1, 1927
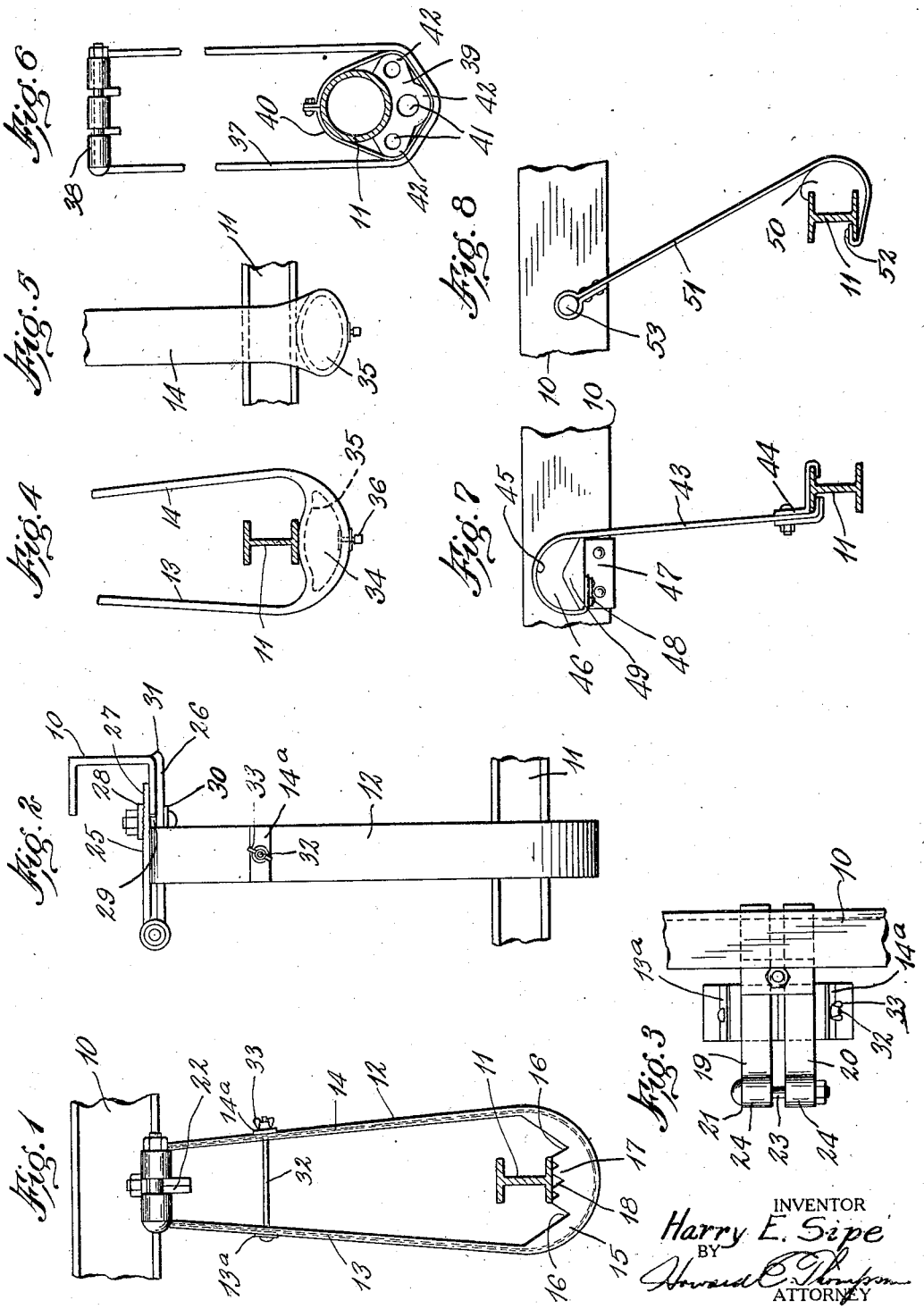
INVENTOR
Harry E. Sipe
BY
ATTORNEY Patented Aug. 4, 1931

1,817,771

UNITED STATES PATENT OFFICE

HARRY E. SIPE, OF NEW YORK, N. Y.

SNUBBER

Application filed July 1, 1927. Serial No. 202,817.

This invention relates to snubbers and particularly to devices of this class for use in connection with motor vehicles; and the object of the invention is to provide a device of the class specified, which is coupled with the axle and framework of the vehicle and bridging the distance therebetween in such manner as to control and ultimately limit the upward or recoil action of the vehicle, and in this way, counteracting the action of the vehicle springs and providing a smooth, spring suspension for the vehicle, and eliminating the vibratory spring suspension common in vehicles of the class under consideration; a further object being to provide a snubber which involves a resilient member, the resiliency or elasticity of which is comparatively small, and yet sufficient to provide for a cushion snubbing control of the vehicle or the body of the vehicle, the resiliency being sufficient to avoid a sudden shock or snubbing action and to, in fact, limit and restrict the recoil action of the vehicle; a further object being to provide a snubber consisting of a strap member or members extending between or bridging the space between the chassis or framework and the axle with means for coupling one end of the strap to the framework or the axle, and the other end of said strap cooperating with a body of rubber which may be solid, hollow or inflatable, which will present a limited amount of resiliency to produce the desired snubbing action, a further object being to provide means for adjusting the relative positions of dual strap members in a device of the class described, thus providing an adjustment to the resiliency of the cushion member employed; and with these and other objects in view, the invention consists in a device of the class and for the purpose specified, which is simple in construction, efficient in use, and which is constructed as hereinafter described and claimed:

The invention is fully disclosed in the following specification, of which the accompanying drawings forms a part, in which the separate parts of my improvement are designated by suitable reference characters in each of the views:

Fig. 1 is a face view of one form of snubber which I employ, and indicating the method of its use.

Fig. 2 is a side view of the construction shown in Fig. 1.

Fig. 3 is a detail, plan view of the structure shown in Figs. 1 and 2.

Fig. 4 is a view similar to Fig. 1 but showing a modified form of snubber.

Fig. 5 is a side view of the structure shown in Fig. 4.

Fig. 6 is a view similar to Fig. 1 but showing another modification; and,

Figs. 7 and 8 are views similar to Fig. 1 and showing other modifications.

In all the views in the drawings, 10 represents a part of the chassis or framework of the vehicle, and 11 one of the axles which may be the front or rear axle of the vehicle. In Figs. 1 to 3 inclusive, I have shown at 12 one form of snubber which consists of side strap members 13 and 14, which may be composed of any suitable material; that is to say, may be metal, canvas, fibre or a combination of such materials, and rubber or a composition of rubber, said strap members being flexible or at least semi-flexible.

As shown in said figures, the strap members join in a crosshead 15, the inner face of which is in the form of a body of rubber, cut out as seen at 16 to form a central, upwardly extending portion 17, the surface of which is preferably grooved as seen at 18. The projecting member 17 is adapted to be placed beneath the front or rear axle 11 of the vehicle, whether of I-beam or circular cross sectional form.

The upper or free ends of the strap members 13 and 14 are passed upwardly and downwardly around the side members 19 and 20, of a bracket 21, and between said side members 19 and 20 as seen at 22, Fig. 1. Said strap members are partially held or clamped in this position by a bolt 23 passed through the tubular ends 24 of the side members 19 and 20. Said tubular ends form the crosshead of a U-shaped body, one arm 25 of which is shorter than the other arm 26 and is provided on its upper, inner face with transverse teeth 27 adapted to be engaged by a lock plate or washer 28 having similar teeth, held in position by a bolt 29 arranged between the side members 19 and 20 of the bracket, adjacent the frame 10 of the vehicle. Said bolt passes through another washer 30 on the lower face of the long arms 26 of the side members 19 and 20. The long arms 26 are curved or flanged as seen at 31 at their inner ends to engage the frame 10 of the vehicle to prevent displacement of the bracket when secured in position as seen in the drawings. It will also be understood that the strap members 13 and 14 are arranged between the short and long arms 25 and 26.

From the foregoing, it will be seen that, in fact, the side portions 19 and 20 constitute separate bracket members but form a bracket part by virtue of the bolt 23 coupling said parts together. In mounting the snubber in connection with the vehicle, and after placing the body 15 beneath the axle 11 as seen in Fig. 1, the free ends of the strap members 13 and 14 are secured within and to the bracket in a comparatively taut arrangement of said strap members, after which the strap members are placed under slight or the desired tension by an adjustment bolt or screw 32, traversing the strap members adjacent the bracket end thereof, to provide sufficient clearance and movement of the axle toward and away from the frame 10. The adjustment referred to may be accomplished by a winged nut 33 on one end of the bolt or screw 32. The strap members 13 and 14 are preferably provided with reinforcing strips or plates 13a and 14a where the bolt or screw 32 cooperates therewith.

It will be understood that the adjustment screw or bolt 32 may be operated to place the block 15 of resilient or cushioning material under such tension as to provide the required snubbing action. This will depend largely upon the vehicle load and spring suspension employed on the several vehicles.

It will also be understood that in the operation of the device, as in Figs. 1 to 3 inclusive, in the downward movement of the body of the vehicle, including the frame 10 with reference to the axle 11 or the upward movement of the axle with relation to the vehicle body, the axle passes freely with reference to said body in the usual manner, and moves out of engagement with the body 15. In the reverse or recoil action, and when the axle strikes and engages the body 15, the sudden shock of the recoil is immediately taken up by the resiliency of the block 15. By virtue of the limitations in this resiliency, and the rigidity or strength of the strap members 13 and 14 and the parts coupling the same to the vehicle frame, the recoil action is checked or snubbed in a very smooth, easy and yet positive fashion, thus providing very comfortable and desirable riding conditions of the vehicle body in the vehicle's progress over an uneven road bed or a road bed having a very irregular and unsmooth surface.

As seen in Figs. 4 and 5 of the drawings, the strap members 13 and 14 may be provided at the crosshead end thereof with a hollow body 34 of rubber, the chamber 35 within said body being adapted to be inflated with air through an inflating nozzle 36. By this construction, it will be understood that the resilient properties of the body 34 which takes up and produces the snubbing action, may be adjusted by increasing or decreasing the pressure of air contained within the chamber 35. It is understood that the body 34 will be constructed to permit of inflation under high as well as low air pressure, to suit vehicles of various kinds and classes, and including trucks, delivery wagons and the like. Of course, the size of the body 34 in its various dimensions, may be made to suit the requirements.

In Fig. 6 of the drawings, I have shown another modification wherein a strap member 37 is coupled with a suitable bracket 38 similar or substantially similar to the bracket 21. This strap member is continuous and formed independent of the resilient body 39 employed, and is capable of movement relatively to said body. The body 39 is held in engagement with the axle 11 by a strap 40 or in any other desired manner. In this construction, the body 39 is composed of solid rubber, except for the recesses or apertures 41 formed therein, and is of a cross sectional form provided on the lower face thereof with three semi-circular surfaces 42, which together with the recesses or apertures 41 will control and regulate the resiliency of the body 39.

In Fig. 7 of the drawings, I have shown another modification, wherein a single strap member 43 is coupled at one end by means of a suitable bracket 44 to the axle 11. The other end is passed around the arc-shaped or semi-circular face 45 of a resilient block 46 and secured to a bracket piece 47 on the frame 10 as seen at 48, said bracket piece having a conical portion 49, upon which the bracket 46 seats.

With this construction, it will be understood that a block 46 of any desired shape or construction may be employed to provide the required resiliency or shock absorbing properties. The drawing is merely illustrative of another method of carrying my invention into effect by the use of a single strap member 34, rather than a pair of strap members as shown in the other figures. Instead of arranging the block 46 at the upper or frame end of the strap member 34, a block 50 may be mounted in connection with the axle 11 as seen in Fig. 8. One end of the strap member 51 is secured to the axle as seen at 52, and passed around the block 50 which is arranged at one side of the axle and secured to a pin, bracket or the like 53 on the frame 10.

In all forms of construction, it will be understood that the snubbing of the vehicle is produced or the recoil action checked through or by means of the resiliency of a solid, semi-solid or inflatable body of rubber, which may be mounted in connection with or cooperate with one end of a strap member, the other end of which is secured to the axle or the frame, depending upon the location of the resilient body.

While I have shown certain details of construction for carrying my invention into effect, it will be understood that I am not necessarily limited to these details, and various changes in and modifications of the construction herein shown and described may be made within the scope of the appended claims, without departing from the spirit of my invention or sacrificing its advantages.

Having fully described my invention, what I claim as new and desire to secure by Letters Patent, is:—

1. A snubber device for vehicles comprising a strap member extending between the axle and frame of the vehicle, means for supporting one end of said strap member, the other end of said strap member cooperating with a body of resilient material disposed between the strap member and one of said first named supports, and means for regulating the resiliency of the device.

2. In a snubber of the class described comprising a strap member adapted to bridge the distance between the axle and the frame of the vehicle, a bracket for securing one end of the strap member to a vehicle frame, said bracket consisting of U-shaped members between which a part of the frame is adapted to be clamped, a bolt for securing said members to the frame, and means for clamping said strap member to said bracket.

3. In a snubber of the class described comprising a strap member adapted to bridge the distance between the axle and the frame of the vehicle, a bracket for securing one end of the strap member to a vehicle frame, said bracket consisting of U-shaped members between which a part of the frame is adapted to be clamped, a bolt for securing said members to the frame, means for clamping said strap member to said bracket, and means for keying said bolt against movement relatively to said bracket.

4. A snubber for vehicles comprising a strap member extending between two vehicle parts, one of said parts constituting an axle and the other a frame of the vehicle, means for supporting one end of the strap member in connection with one of said parts, a body of resilient material of such form as to provide free flow and displacement of such material when subjected to compression and arranged between the other part and the other end of the strap member, the last named end of the strap member cooperating with said body of resilient material to place the major portion of the same under compression in the action of the snubber.

5. A snubber for vehicles comprising a strap member extending between two vehicle parts, one of said parts constituting an axle and the other a frame of the vehicle, means for supporting one end of the strap member in connection with one of said parts, a body of resilient material arranged between the other part and the other end of the strap member, the last named end of the strap member cooperating with said body of resilient material to place the major portion of the same under compression in the action of the snubber, and means for regulating the resiliency of the device.

6. A snubber for vehicles comprising a non-extensible member arranged between two vehicle parts, one of said parts constituting an axle and the other a frame of the vehicle, means for supporting one end of said member in connection with one of said parts, a resilient body of such form as to provide free flow and displacement of said body when subjected to compression and arranged between the other part and the other end of said member, the last named end of said member cooperating with said resilient body to place the major portion of the same under compression in the action of the snubber.

7. A snubber of the class described comprising a band of non-extensible material arranged between two relatively movable parts, said band being looped around one of said parts and attached to the other part and a body of compressible material disposed between the looped portion of said band and the adjacent part and the major portion of which is adapted to be placed under compression in the action of the snubber, and means for adjusting the band to regulate the resiliency of the snubber.

8. A snubber comprising a substantially U-shaped member, the crosshead of said member being arranged beneath the axle of a vehicle and the ends of the sides of said member being attached to the vehicle frame and a resilient body arranged between the crosshead of said member and the axle and the major portion of which is adapted to be placed under compression in the action of the snubber.

9. A snubber comprising a substantially U-shaped member, the crosshead of said member being arranged beneath the axle of a vehicle and the ends of the sides of said member being attached to the vehicle frame and a resilient body arranged between the crosshead of said member and the axle and adapted to be placed under compression in the action of the snubber, and that part of the resilient body arranged centrally of the crosshead and said axle being of greater dimensions than the remainder of said body.

10. A snubber of the class described comprising a band of non-extensible material arranged between two relatively movable parts, means for attaching one end of said band to one of said parts, a relatively large body of rubber disposed between the other end portion of said band and said other part and being of such contour as to permit a free flow or displacement of the rubber when placed under compression, and the arrangement of said body of rubber between said band and part being such as to subject the major portion of said body to compression in the use of the snubber.

11. A snubber of the class described comprising a band of non-extensible material arranged between two relatively movable parts, means for attaching one end of said band to one of said parts, a relatively large body of rubber disposed between the other end portion of said band and said other part and being of such contour as to permit a free flow or displacement of the rubber when placed under compression, the arrangement of said body of rubber between said band and part being such as to subject the major portion of said body to compression in the use of the snubber, and means involving a bracket for detachably supporting the first named end of said band in connection with said first named part.

12. A snubber of the class described comprising a band of non-extensible material arranged between two relatively movable parts, means for attaching one end of said band to one of said parts, a relatively large body of rubber disposed between the other end portion of said band and said other part and being of such contour as to permit a free flow or displacement of the rubber when placed under compression, the arrangement of said body of rubber between said band and part being such as to subject the major portion of said body to compression in the use of the snubber, and means for adjusting said band to regulate the resiliency of said snubber.

In testimony that I claim the foregoing as my invention I have signed my name this 29th day of June, 1927.

HARRY E. SIPE.